United States Patent
Igarashi

(10) Patent No.: US 9,196,162 B2
(45) Date of Patent: Nov. 24, 2015

(54) VEHICULAR DRIVING SUPPORT SYSTEM

(75) Inventor: Shinji Igarashi, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/346,793

(22) PCT Filed: Sep. 26, 2011

(86) PCT No.: PCT/JP2011/071888
§ 371 (c)(1),
(2), (4) Date: Mar. 24, 2014

(87) PCT Pub. No.: WO2013/046298
PCT Pub. Date: Apr. 4, 2013

(65) Prior Publication Data
US 2014/0257593 A1   Sep. 11, 2014

(51) Int. Cl.
*G08G 1/16* (2006.01)
*B60W 30/09* (2012.01)
*B60W 30/095* (2012.01)

(52) U.S. Cl.
CPC ............... *G08G 1/16* (2013.01); *B60W 30/09* (2013.01); *B60W 30/095* (2013.01); *G08G 1/165* (2013.01); *B60W 2520/10* (2013.01); *B60W 2520/125* (2013.01); *B60W 2540/18* (2013.01); *B60W 2710/207* (2013.01)

(58) Field of Classification Search
CPC ... G08G 1/16; G08G 1/165; B60W 2520/125; B60W 2540/18; B60W 2710/201; B60W 2520/10; B60W 30/095; B60W 30/09
USPC ............................................................ 701/1
See application file for complete search history.

(56) References Cited

U.S. PATENT DOCUMENTS

| | | | |
|---|---|---|---|
| 6,574,559 B2 * | 6/2003 | Shinmura et al. | 701/301 |
| 2007/0299610 A1 | 12/2007 | Ewerhart et al. | |
| 2008/0243389 A1 | 10/2008 | Inoue et al. | |
| 2010/0030426 A1 * | 2/2010 | Okita | 701/41 |

FOREIGN PATENT DOCUMENTS

| | | |
|---|---|---|
| CN | 1922051 A | 2/2007 |
| JP | 05-050937 A | 3/1993 |
| JP | 07-149193 A | 6/1995 |
| JP | 2008-242544 A | 10/2008 |
| JP | 2009-298355 A | 12/2009 |
| JP | 2010179843 A | 8/2010 |

* cited by examiner

Primary Examiner — Mary Cheung
Assistant Examiner — Michael Berns
(74) Attorney, Agent, or Firm — Kenyon & Kenyon LLP

(57) ABSTRACT

It is a task of the invention to provide an art that makes it possible to provide driving support suited for the feeling of a driver in a system that supports the avoidance of a collision of a vehicle. In order to achieve this task, according to the invention, in a system that supports the avoidance of a collision of a vehicle, a traveling range as a range of a route on which a host vehicle is to travel in a range of a driving operation to be normally performed by a driver is obtained, driving support is not provided if there is a route that allows a solid body to be avoided within the traveling range, and driving support is provided if there is no route that allows the solid body to be avoided within the traveling range.

5 Claims, 8 Drawing Sheets

VEHICULAR DRIVING SUPPORT SYSTEM

CROSS-REFERENCE TO RELATED APPLICATIONS

This is a national phase application based on the PCT International Patent Application No. PCT/JP2011/071888 filed on Sep. 26, 2011, the entire contents of which are incorporated herein by reference.

TECHNICAL FIELD

The invention relates to an art of providing driving support for avoiding a solid body that exists on a path of a host vehicle.

BACKGROUND ART

There has been proposed an art of providing driving support by warning a driver or activating a braking device when a solid body that exists on a path of a host vehicle is detected and a time required for the host vehicle to reach the solid body or a relative distance between the host vehicle and the solid body becomes equal to or shorter than a threshold (e.g., see Patent Document 1).

RELATED ART DOCUMENT

Patent Document

Patent Document 1: Japanese Patent Application Publication No. 07-149193 (JP-07-149193 A)

SUMMARY OF THE INVENTION

Problem to be Solved by the Invention

By the way, in the aforementioned conventional art, driving support may be provided against the intention of the driver. Therefore, there is a room for improvement in a method of determining whether to provide driving support or not.

The invention has been made in view of the aforementioned various circumstances. It is an object of the invention to provide an art that makes it possible to provide driving support suited for the feeling of a driver in a system that supports the avoidance of a collision of a vehicle.

Means for Solving the Problem

In order to solve the aforementioned problem, according to the invention, in a system that supports the avoidance of a collision of a vehicle, a range of a route on which a host vehicle is to travel in the future in a range of a driving operation to be normally performed by a driver is specified, and driving support is provided on the condition that there be no route that allows a solid body to be avoided within the range.

More specifically, a vehicular driving support system according to the invention includes recognition means for recognizing a solid body that exists around a host vehicle, acquisition means for acquiring a current movement amount of the host vehicle, and support means for providing support for avoiding a collision with the solid body on a condition that there be no avoidance line as a route that allows a collision with the solid body recognized by the recognition means to be avoided in a traveling range as a range of a route on which the host vehicle is to travel, if a change in a movement amount that is produced within a driving operation to be normally performed by a driver is increased or reduced from the movement amount acquired by the acquisition means.

According to the invention, the range (the traveling range) of the route on which the host vehicle is to travel in the future is obtained on the basis of the change (hereinafter referred to as "a normal change") in the movement amount of the host vehicle that is increased or reduced through the driving operation to be normally performed by the driver and the current movement amount of the host vehicle. This traveling range includes a route that is followed by the host vehicle if it is assumed that the driver performs a normal driving operation (if it is assumed that the movement amount of the host vehicle changes through the performance of the normal driving operation by the driver) in addition to a route that is followed by the host vehicle if it is assumed that the driving operation state of the driver remains unchanged (if it is assumed that the movement amount of the vehicle remains unchanged). Incidentally, "the normal driving operation" mentioned herein includes a steering operation (steering) in addition to a braking operation.

In the case where there is an avoidance line within the traveling range, the driver performs the normal driving operation, thereby making it possible to avoid a collision of the host vehicle with the solid body. Thus, if driving support is provided regardless of the driver's intention of performing a driving operation as usual in the future, the driver may feel troubled.

In contrast, the driving support system according to the invention does not provide driving support if there is an avoidance line within the traveling range, namely, if a collision of the host vehicle with the solid body can be avoided through the performance of the normal driving operation by the driver. As a result, it is possible to avoid a situation where driving support is provided regardless of the driver's intention of performing the normal driving operation.

Incidentally, in the case where driving support is not provided by the support means, the driver may not perform the driving operation as usual. For example, if the consciousness level of the driver is low or the driver looks off, the driver may not perform the normal driving operation. However, in the case where the driver does not perform the normal driving operation, the number of alternatives for the avoidance line decreases as the vehicle approaches the solid body. Then, as soon as there ceases to be an avoidance line within the traveling range, driving support is provided. As a result, even in the case where the driver does not perform the normal driving operation, a collision of the host vehicle with the solid body can be avoided.

It should be noted herein that the aforementioned normal change may be obtained in advance through an adaptation processing that utilizes an experiment or the like, or may be learned on the basis of a driving operation history of the driver. In this case, the normal change may be a fixed value, or may be a variable value that is increased/reduced in accordance with the traveling speed of the host vehicle. In the case where the normal change is increased/reduced in accordance with the traveling speed, the normal change may be made larger when the vehicle speed is low than when the vehicle speed is high. This is because the range of the driving operation that can normally be performed by the driver is more likely to be enlarged and thus the normal change is also larger when the vehicle speed is low than when the vehicle speed is high.

As "the movement amount" of the host vehicle in the invention, it is possible to use a yaw rate that acts on the host vehicle, an acceleration (a longitudinal acceleration) that acts in the longitudinal direction of the vehicle, an acceleration (a lateral acceleration) that acts in the lateral direction of the vehicle, a G (a longitudinal G) that acts in the longitudinal direction of the vehicle, a G (a lateral G) that acts in the lateral direction of the vehicle, a cornering force, or the like.

Incidentally, the parameter that is used as "the movement amount" of the host vehicle in the invention is desired to be a parameter that makes the foregoing traveling range narrower when the traveling speed of the host vehicle is high than when the traveling speed of the host vehicle is low, as is the case with the lateral acceleration and the lateral G. If this parameter is used as the movement amount, the traveling range is narrower when the vehicle speed is high than when the vehicle speed is low. As a result, the timing at which there ceases to be an avoidance line within the traveling range (in other words, the timing at which driving support is provided) is earlier when the vehicle speed is high than when the vehicle speed is low. In consequence, a collision of the host vehicle with the solid body can be avoided even in the case where the traveling speed of the host vehicle is high.

Next, in the vehicular driving support system according to the invention, if there is no avoidance line within the traveling range, the support means may perform driving support immediately or as soon as the length of the longest one of the routes included in the traveling range becomes equal to or shorter than a threshold.

In the case where there is no avoidance line within the traveling range, if driving support is immediately provided, a collision is more likely to be avoided. However, a certain driver starts a driving operation at a relatively late timing in some cases. Therefore, if driving support is immediately provided when there is no avoidance line within the traveling range, the driver may feel troubled. In contrast, if driving support is provided as soon as the length of the longest one of the routes included in the traveling range becomes equal to or shorter than the threshold, it is possible to provide driving support without making the driver feel troubled as described above. Incidentally, "the threshold" mentioned herein is a value that is obtained by adding a margin to the shortest length that allows a collision of the host vehicle with the solid body to be avoided by providing driving support.

Driving support according to the invention is a processing of outputting at least one of a warning sound, a warning lamp and a message to a speaker or a display, a processing of automatically performing a steering operation (steering) and/or a braking operation, or the like. Incidentally, the foregoing threshold can be made smaller in the case where driving support is provided with the steering operation and the braking operation combined with each other than in the case where driving support is provided through only one of the steering operation and the braking operation. Therefore, a collision of the host vehicle with the solid body can be avoided while making the timing at which driving support is provided as late as possible.

Effect of the Invention

The invention makes it possible to provide support suited for the feeling of a driver in a system that supports the avoidance of a collision of a vehicle.

MODES FOR CARRYING OUT THE INVENTION

Concrete embodiments of the invention will be described hereinafter on the basis of the drawings. In this case, an example in which the invention is applied to a system that makes determinations on a traveling road of a host vehicle and an obstacle and provides support for avoiding a deviation from the traveling road on which the determination is made or a collision with the obstacle will be described. Incidentally, the "support" mentioned herein is a processing that is performed at a timing when the host vehicle can avoid a solid body as the obstacle. This processing is performed earlier than a collision damage mitigation processing that is performed if a collision of the vehicle with the obstacle is unavoidable. Besides, the configuration that will be described in each of the following embodiments of the invention indicates a mode of carrying out the invention, and does not limit the configuration of the invention.

First Embodiment

Figure 1:
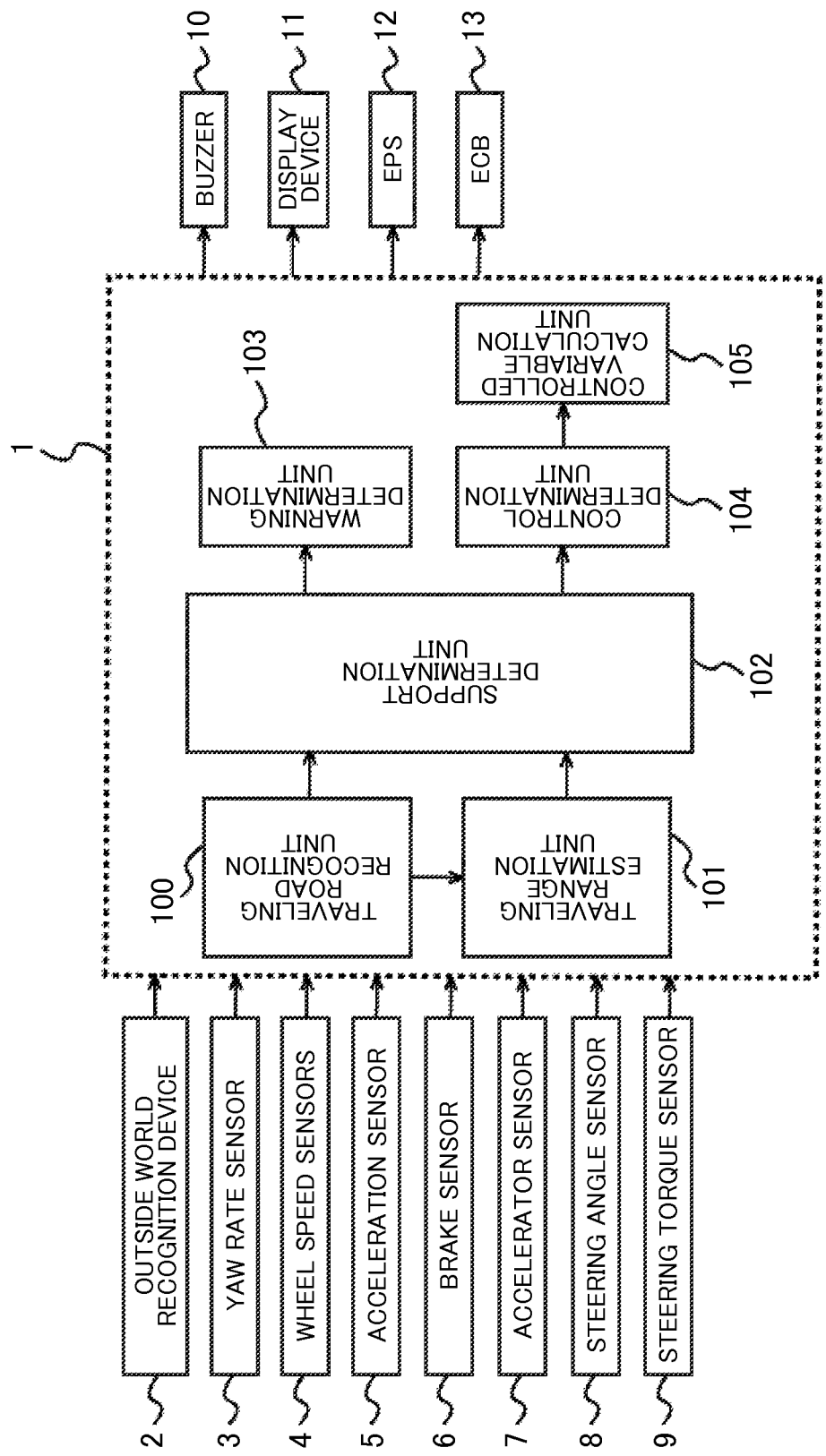
FIG. 1 is a view showing the configuration of a vehicular driving support system according to the invention.

First of all, the first embodiment of the invention will be described on the basis of FIGS. 1 to 6. FIG. 1 is a block diagram functionally showing the configuration of a vehicular driving support system to which the invention is applied. As shown in FIG. 1, a vehicle is mounted with a control unit (an ECU) 1 for driving support.

The ECU 1 is an electronic control unit that is equipped with a CPU, a ROM, a RAM, a backup RAM, an I/O interface, and the like. Various sensors such as an outside world recognition device 2, a yaw rate sensor 3, wheel speed sensors 4, an acceleration sensor 5, a brake sensor 6, an accelerator sensor 7, a steering angle sensor 8, a steering torque sensor 9 and the like are electrically connected to the ECU 1. Output signals of those sensors are input to the ECU 1.

The outside world recognition device 2 includes at least one of a laser imaging detection and ranging unit (an LIDAR), a laser range finder (an LRF), a millimeter-wave radar, a stereo camera and the like, and detects information on a position of a host vehicle relative to a solid body that exists around the vehicle (e.g., a relative distance and a relative angle).

The yaw rate sensor 3 is fitted to, for example, a vehicle body of the host vehicle, and outputs an electric signal that is correlated with a yaw rate that acts on the host vehicle. The wheel speed sensors 4 are sensors that are fitted to wheels of the host vehicle respectively and output electric signals that are correlated with a traveling speed (a vehicle speed) of the vehicle respectively. The acceleration sensor 5 outputs an electric signal that is correlated with an acceleration (a longitudinal acceleration) that acts in a longitudinal direction of the host vehicle and an acceleration (a lateral acceleration) that acts in a lateral direction of the host vehicle.

The brake sensor 6 is fitted to, for example, a brake pedal in a vehicle interior, and outputs an electric signal that is correlated with an operation torque (a depression force) of the brake pedal. The accelerator sensor 7 is fitted to, for example, an accelerator pedal in the vehicle interior, and outputs an electric signal that is correlated with an operation torque (a depression force) of the accelerator pedal. The steering angle sensor 8 is fitted to, for example, a steering rod that is connected to a steering wheel in the vehicle interior, and outputs an electric signal that is correlated with a rotational angle (a steering angle) from a neutral position of the steering wheel. The steering torque sensor 9 is attached to a steering rod, and outputs an electric signal that is correlated with a torque (a steering torque) that is input to the steering wheel.

Besides, various instruments such as a buzzer 10, a display device 11, an electric power steering (an EPS) 12, an electronically controlled brake (an ECB) 13 and the like are connected to the ECU 1. Those various instruments are electrically controlled by the ECU 1.

The buzzer 10 is a device that is fitted in, for example, the vehicle interior and outputs a warning sound or the like. The display device 11 is a device that is fitted in, for example, the vehicle interior and displays various messages and a warning lamp. The electric power steering (the EPS) 12 is a device that assists a steering torque of the steering wheel with the aid of a torque that is generated by an electric motor. The electronically controlled brake (the ECB) 13 is a device that electrically adjusts a pressure of hydraulic oil (a brake hydraulic pressure) in a frictional brake that is provided in each of the wheels.

In order to control the various instruments with the aid of output signals of the aforementioned various sensors, the ECU 1 has the following functions. That is, the ECU 1 is equipped with a traveling road recognition unit 100, a traveling range estimation unit 101, a support determination unit 102, a warning determination unit 103, a control determination unit 104, and a controlled variable calculation unit 105.

The traveling road recognition unit 100 generates information on a road (a traveling road) on which the host vehicle is to travel, on the basis of information output from the outside world recognition device 2. For example, the traveling road recognition unit 100 generates information on positions of indices indicating solid bodies that can be obstacles for the host vehicle and lane borders (e.g., road indications such as white lines, yellow lines and the like, which indicate lane borders, curbstones that extend beside the lanes, guardrails, grooves, walls, solid bodies such as poles and the like, etc.) and the posture of the host vehicle with respect to those solid bodies and the lane borders (a distance, a yaw angle, and the like), in a coordinate system having an origin at which the host vehicle is located. Incidentally, the traveling road recognition unit 100 is equivalent to the recognition means according to the invention.

The traveling range estimation unit 101 specifies a route that is estimated to be followed by the host vehicle from now in the coordinate system that is generated by the traveling road recognition unit 100. In this case, the traveling range estimation unit 101 specifies a range (a traveling range) of a route on which the host vehicle is to travel in the future in a range of a driving operation to be normally performed by a driver.

Figure 2:
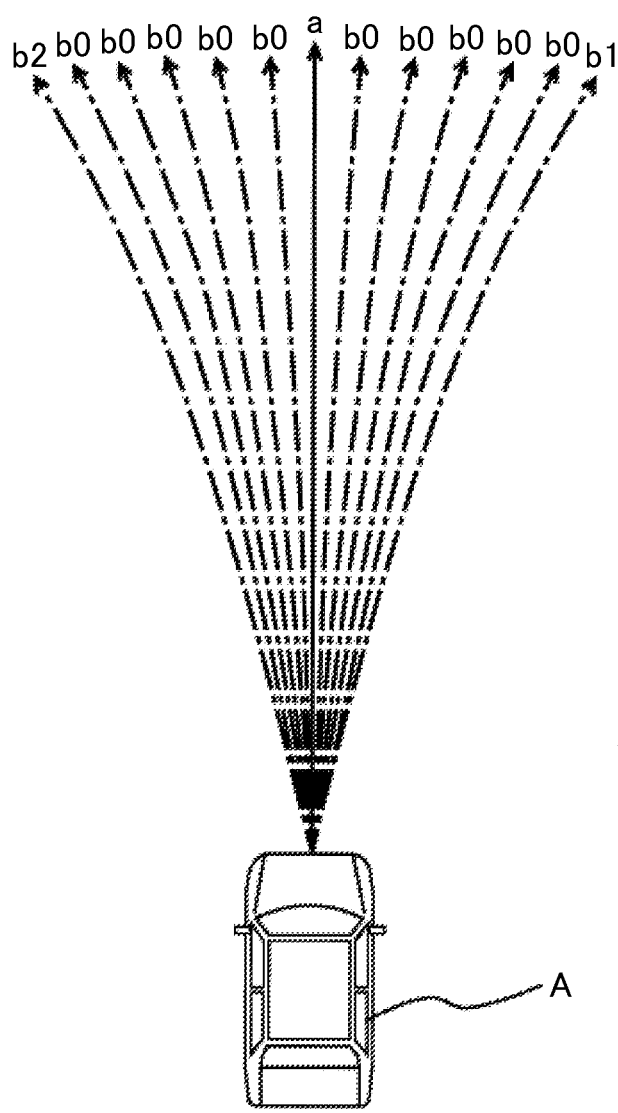
FIG. 2 is a view showing a method of obtaining a traveling range.

Specifically, as shown in FIG. 2, the traveling range estimation unit 101 acquires a current lateral acceleration $Gy0$ of a host vehicle A from an output signal of the acceleration sensor 5, and specifies a route a that is estimated to be followed by the host vehicle A in the case where the host vehicle A travels while maintaining the current lateral acceleration $Gy0$. Subsequently, the traveling range estimation unit 101 specifies a route $b1$ that is estimated to be followed by the host vehicle A in the case where a normal change $\Delta Gy$ is added to the current lateral acceleration $Gy0$ of the host vehicle A, and specifies a route $b2$ that is estimated to be followed by the host vehicle A in the case where the normal change $\Delta Gy$ is subtracted from the current lateral acceleration $Gy0$ of the host vehicle A. In this case, the traveling range estimation unit 101 may calculate a turning radius R of the host vehicle A from a value obtained by adding the normal change $\Delta Gy$ to the current lateral acceleration $Gy0$ or a value obtained by subtracting the normal change $\Delta Gy$ from the current lateral acceleration $Gy0$, and specify the routes $b1$ and $b2$ on the basis of the calculated turning radius R. Incidentally, the turning radius R can be obtained by dividing a vehicle speed V by a yaw rate $\gamma$ ($R=V/\gamma$), and the yaw rate $\gamma$ can be obtained by dividing the lateral acceleration $Gy$ by the vehicle speed V ($\gamma=Gy/V$). Subsequently, the traveling range estimation unit 101 specifies a route $b0$ in the case where the steering angle or the lateral acceleration is changed stepwise by a certain amount, in a range (a traveling range) from the foregoing route $b1$ to the foregoing route $b2$.

It should be noted herein that the normal change $\Delta Gy$ is an amount equivalent to a maximum amount of change in the lateral acceleration within a range of a driving operation that can normally be performed by the driver, and is an amount that is experimentally obtained in advance. Incidentally, if the host vehicle A is already in a turning state at the moment ($\oplus Gy0|>0$), an absolute value ($|Gy0 \pm \Delta Gy|$) of the value that is obtained by adding the normal change $\Delta Gy$ to the current lateral acceleration $Gy0$ or subtracting the normal change $\Delta Gy$ from the current lateral acceleration $Gy0$ may become larger than a maximum lateral acceleration (e.g., 0.2 G to 0.3 G) that can be generated through the normal driving operation by the driver. In consequence, the magnitude of the normal change $\Delta Gy$ may be limited such that the absolute value of the value that is obtained by adding the normal change $\Delta Gy$ to the current lateral acceleration $Gy0$ or subtracting the normal change $\Delta Gy$ from the current lateral acceleration $Gy0$ becomes equal to or smaller than the maximum lateral acceleration.

Figure 3:
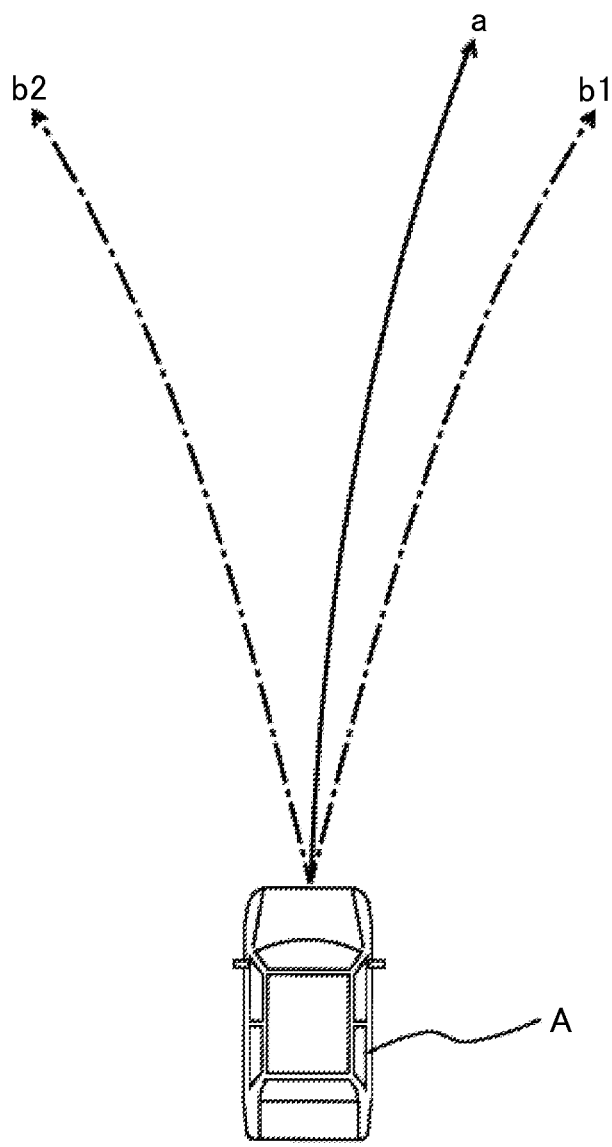
FIG. 3 is a view showing another method of obtaining the traveling range.

Besides, in specifying the traveling range, the traveling range estimation unit 101 may set, as the routes $b1$ and $b2$, routes that are estimated to be followed by the host vehicle in the case where the host vehicle travels at the maximum lateral acceleration. For example, as shown in FIG. 3, the traveling range estimation unit 101 may set, as the route $b1$, a route that is estimated to be followed by the host vehicle in the case where the host vehicle travels while making a right turn at the maximum lateral acceleration, and set, as the route $b2$, a route that is followed by the host vehicle in the case where the host vehicle travels while making a left turn at the maximum lateral acceleration.

Figure 4:
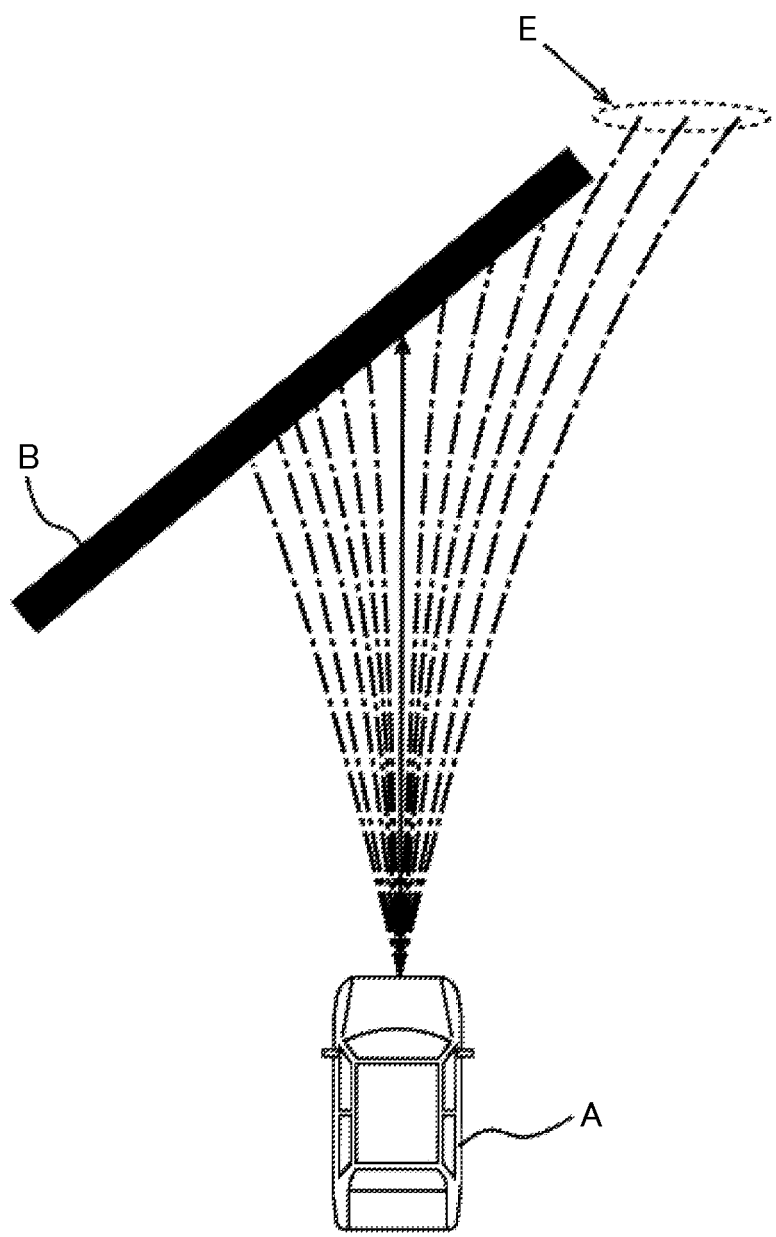
FIG. 4 is a view showing an example in which there is an avoidance line within the traveling range.
Figure 5:
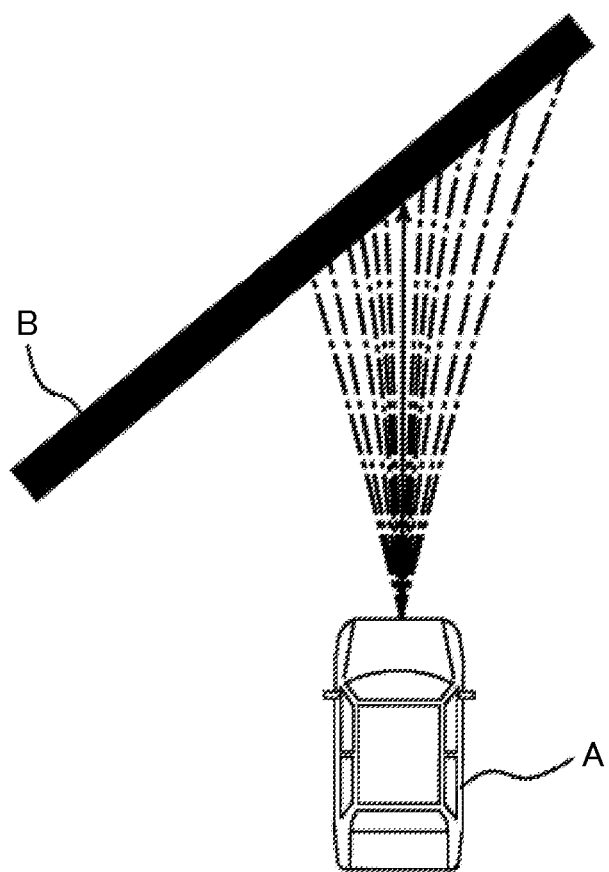
FIG. 5 is a view showing an example in which there is no avoidance line within the traveling range.

Subsequently, the support determination unit 102 determines whether to provide driving support or not, on the basis of the information generated by the traveling road recognition unit 100 and the traveling range estimated by the traveling range estimation unit 101. Specifically, as shown in FIG. 4, if there is a route (an avoidance line) E that allows a solid body B to be avoided within the traveling range, the support determination unit 102 prohibits driving support from being provided. On the other hand, as shown in FIG. 5, if there is no avoidance line, the support determination unit 102 permits driving support to be provided.

If the support determination unit 102 permits driving support to be provided, the warning determination unit 103 warns the driver by ringing the buzzer 10, displaying a warning message or a warning lamp by the display device 11, etc. For example, if the support determination unit 102 permits driving support to be provided (if there ceases to be an avoidance line in the traveling range), the warning determination unit 103 may immediately ring the buzzer 10 or cause the display device 11 to display the warning message or the warning lamp.

Besides, as soon as the distance between the host vehicle and the solid body becomes equal to or shorter than a predetermined distance as to a route on which the distance between the host vehicle and the solid body is longest among routes included in the traveling range, the warning determination unit 103 may ring the buzzer 10, or cause the display device 11 to display the warning message or the warning lamp. Furthermore, the warning determination unit 103 may calculate a time required for the host vehicle A to reach the solid body B as to the route on which the distance between the host vehicle and the solid body is longest, and ring the buzzer 10 or cause the display device 11 to display the warning message or the warning lamp as soon as the calculation result becomes equal to or shorter than a predetermined time. In this manner, if a timing at which the buzzer 10 is rung, or a timing at which the warning message or the warning lamp is displayed by the display device 11 is determined with respect to the route on which the distance between the host, vehicle and the solid body is longest, those timings can be made as late as possible. As a result, driving support can be provided without making the driver feel troubled.

It should be noted herein that the foregoing predetermined distance or the foregoing predetermined time may be changed in accordance with an output signal of the yaw rate sensor 3 or output signals of the wheel speed sensors 6. For example, the predetermined distance or the predetermined time may be set longer when the vehicle speed is high than when the vehicle speed is low. Besides, the predetermined distance or the predetermined time may be set longer when the yaw rate is large than when the yaw rate is small.

Incidentally, it is also appropriate to set the lengths of the respective routes included in the traveling range to the predetermined distance, and ring the buzzer 10 or cause the display device 11 to display the warning message or the warning lamp as soon as all the routes within the traveling range interfere with the solid body. Besides, the method of warning the driver is not limited to the method of ringing the buzzer 10 or the method of causing the display device 11 to display the warning message or the warning lamp. For example, a method of intermittently changing the fastening torque of a seat belt may be adopted.

If the support determination unit 102 permits the driving support processing to be performed, the control determination unit 104 determines timings at which the electric power steering (the EPS) 12 and the electronically controlled brake (the ECB) 13 are operated, in order to avoid a collision of the host vehicle with the solid body.

Specifically, the control determination unit 104 may operate the electric power steering (the EPS) 12 and the electronically controlled brake (the ECB) 13 as soon as the distance between the host vehicle and the solid body becomes equal to or shorter than a predetermined distance as to the route on which the distance between the host vehicle and the solid body is longest, among the routes included in the traveling range. Besides, the control determination unit 104 may calculate a time required for the host vehicle to reach the solid body as to the route on which the distance between the host vehicle and the solid body is longest, among the routes included in the traveling range, and operate the electric power steering (the EPS) 12 and the electronically controlled brake (the ECB) 13 as soon as the calculation result becomes equal to or shorter than a predetermined time.

In this manner, if the timings at which the electric power steering (the EPS) 12 and the electronically controlled brake (the ECB) 13 are operated are determined with respect to the route on which the distance between the host vehicle and the solid body is longest, it is possible to make those timings as late as possible. As a result, driving support can be provided without making the driver feel troubled.

Incidentally, it is also appropriate to set the lengths of the respective routes included in the traveling range to the predetermined distance, and operate the electric power steering (the EPS) 12 and the electronically controlled brake (the ECB) 13 as soon as all the routes in the traveling range interfere with the solid body.

The predetermined distance and predetermined time that are used by the control determination unit 104 may be changed in accordance with the vehicle speed and the yaw rate, as is the case with the predetermined distance and predetermined time that are used by the warning determination unit 103, but are set equal to or shorter than the predetermined distance and predetermined time that are used by the warning determination unit 103, respectively.

When the control determination unit 104 determines the timings at which the electric power steering (the EPS) 12 and the electronically controlled brake (the ECB) 13 are operated, the controlled variable calculation unit 105 calculates controlled variables of the electric power steering (the EPS) 12 and the electronically controlled brake (the ECB) 13, and operates the electric power steering (the EPS) 12 and the electronically controlled brake (the ECB) 13 in accordance with the calculated controlled variables and the timings on which the determinations are made by the control determination unit 104.

For example, the controlled variable calculation unit 105 calculates a target yaw rate needed to avoid a collision of the host vehicle with the solid body. Subsequently, the controlled variable calculation unit 105 determines a controlled variable (a steering torque) of the electric power steering (the EPS) 12 and a controlled variable (a brake hydraulic pressure) of the electronically controlled brake (the ECB) 13 such that an actual yaw rate of the host vehicle (an output signal of the yaw rate sensor 3) coincides with the target yaw rate. In this case, a relationship between the target yaw rate and the steering torque and a relationship between the target yaw rate and the brake hydraulic pressure may be mapped in advance.

Incidentally, the method of decelerating the vehicle is not limited to the method of operating the frictional brake by the electronically controlled brake (the ECB) 13. A method of converting (regenerating) kinetic energy of the vehicle into electric energy, or a method of changing the speed ratio of a transmission to cause an increase in engine brake may be employed. Besides, the method of changing the yaw rate of the vehicle is not limited to the method of changing the steering angle by the electric power steering (the EPS) 12. A method of applying different brake hydraulic pressures to the right and left wheels of the host vehicle respectively may be employed.

It should be noted herein that the foregoing traveling range estimation unit 101, the foregoing support determination unit 102, the foregoing warning determination unit 103, the foregoing control determination unit 104, and the foregoing controlled variable calculation unit 105 are equivalent to the support means according to the invention.

Figure 6:
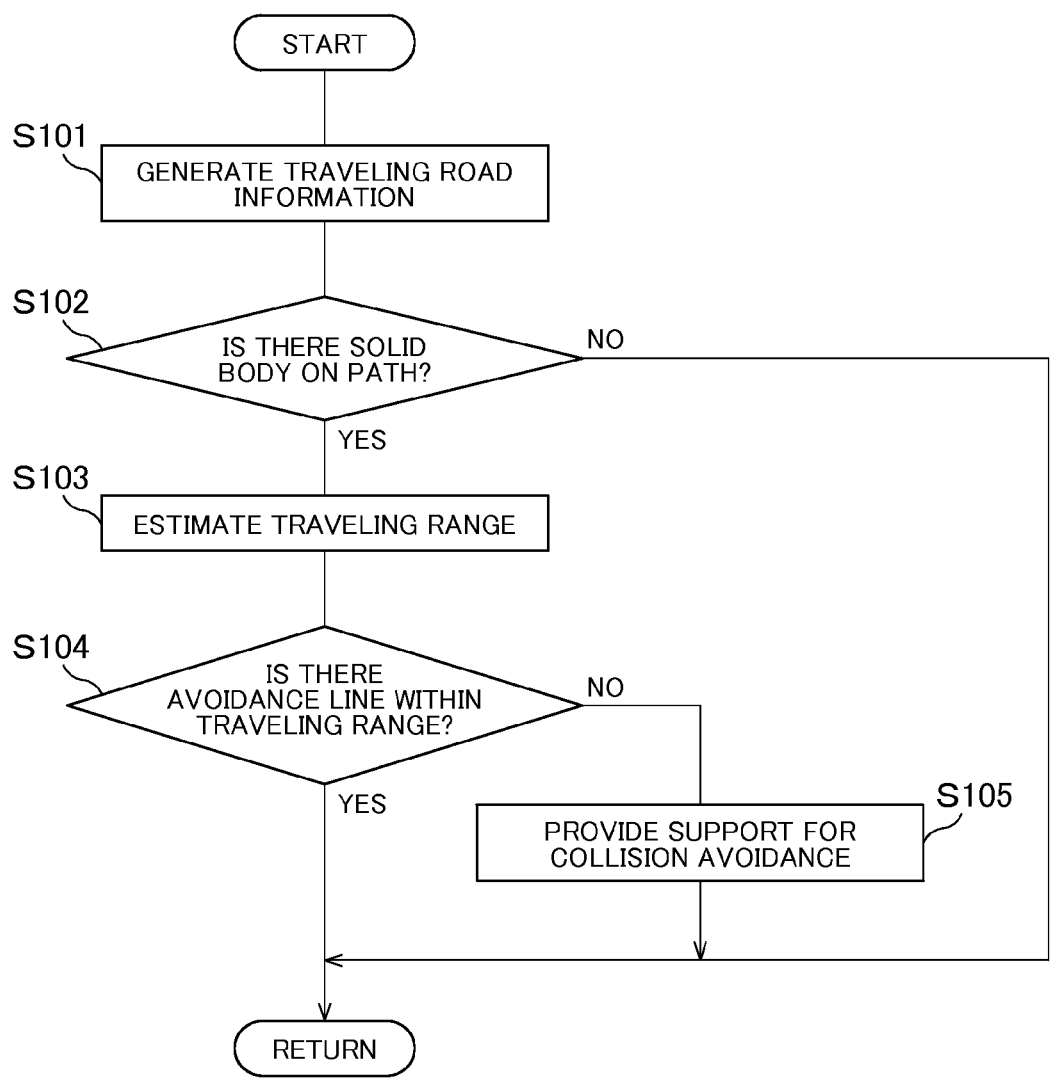
FIG. 6 is a flowchart showing a procedure of providing driving support.

A procedure of providing driving support in this embodiment of the invention will be described hereinafter with reference to FIG. 6. FIG. 6 is a processing routine that is repeatedly executed by the ECU 1. This processing routine is stored in advance in a ROM or the like of the ECU 1.

In the processing routine of FIG. 6, first of all in S101, the ECU 1 generates information on a traveling road on which the host vehicle is to travel in the future (traveling road information), on the basis of an output signal of the outside world recognition device 2. That is, the ECU 1 generates information on position coordinates and sizes of a solid body that can be an obstacle of the host vehicle and an index indicating a lane border in a coordinate system having an origin where the host vehicle is located, and generates information on the posture of the host vehicle with respect to the solid body and the lane border.

In S102, the ECU 1 determines, on the basis of the traveling road information generated in the S101, whether or not there is a solid body as an obstacle on a path of the host vehicle. The "path" mentioned herein is a route that is estimated to be followed by the host vehicle in the case where the host vehicle travels while maintaining the current lateral acceleration Gy0. If the result of the determination in S102 is negative, the ECU 1 temporarily ends the execution of the present routine. On the other hand, if the result of the determination in S102 is positive, the ECU 1 proceeds to S103.

In S103, the ECU 1 reads the output signal (the lateral acceleration of the host vehicle at the moment) Gy0 of the acceleration sensor 5, and estimates a traveling range of the host vehicle with respect to the read lateral acceleration Gy0. That is, as stated in the description of the foregoing FIG. 2, the ECU 1 specifies the routes b1 and b2 by adding the normal change ΔGy to the lateral acceleration Gy0 at the moment and subtracting the normal change ΔGy from the lateral acceleration Gy0 at the moment. Subsequently, the ECU 1 specifies the route b0 in the case where the steering angle or the lateral acceleration is changed stepwise by a certain amount in the range from the route b1 to the route b2.

In S104, the ECU 1 compares the position of the solid body in the coordinate system generated in the S101 with the traveling range estimated in the S103, and determines whether or not there is an avoidance line that allows the solid body to be avoided within the traveling range. In other words, the ECU 1 determines whether or not a collision of the host vehicle with the solid body can be avoided through the performance of the normal driving operation by the driver.

If the result of the determination in the S104 is positive, the ECU 1 ends the execution of the present routine without providing driving support. On the other hand, if the result of the determination in the S104 is negative, the ECU 1 proceeds to S105.

In S105, the ECU 1 provides driving support with the aid of the buzzer 10 or the display device 11, or provides driving support with the aid of the electric power steering (the EPS) 12 and/or the electronically controlled brake (the ECB) 13.

According to the embodiment of the invention described above, if a collision of the host vehicle with the solid body can be avoided through the performance of the normal driving operation by the driver, driving support is not provided. Therefore, driving support is stopped from being provided despite the driver's intention of performing the normal driving operation.

Incidentally, according to the driving support system of this embodiment of the invention, even in the case where the driver does not intend to perform the normal driving operation (e.g., in the case where the consciousness level of the driver has fallen, the case where the driver looks off, etc.), driving support is not provided as long as there is an avoidance line within the traveling range. However, if the host vehicle approaches the solid body, there ceases to be an avoidance line within the traveling range, and hence driving support is provided before the host vehicle collides with the solid body. In consequence, even in the case where the driver does not perform the normal driving operation, a collision of the host vehicle with the solid body can be avoided.

Figure 7:
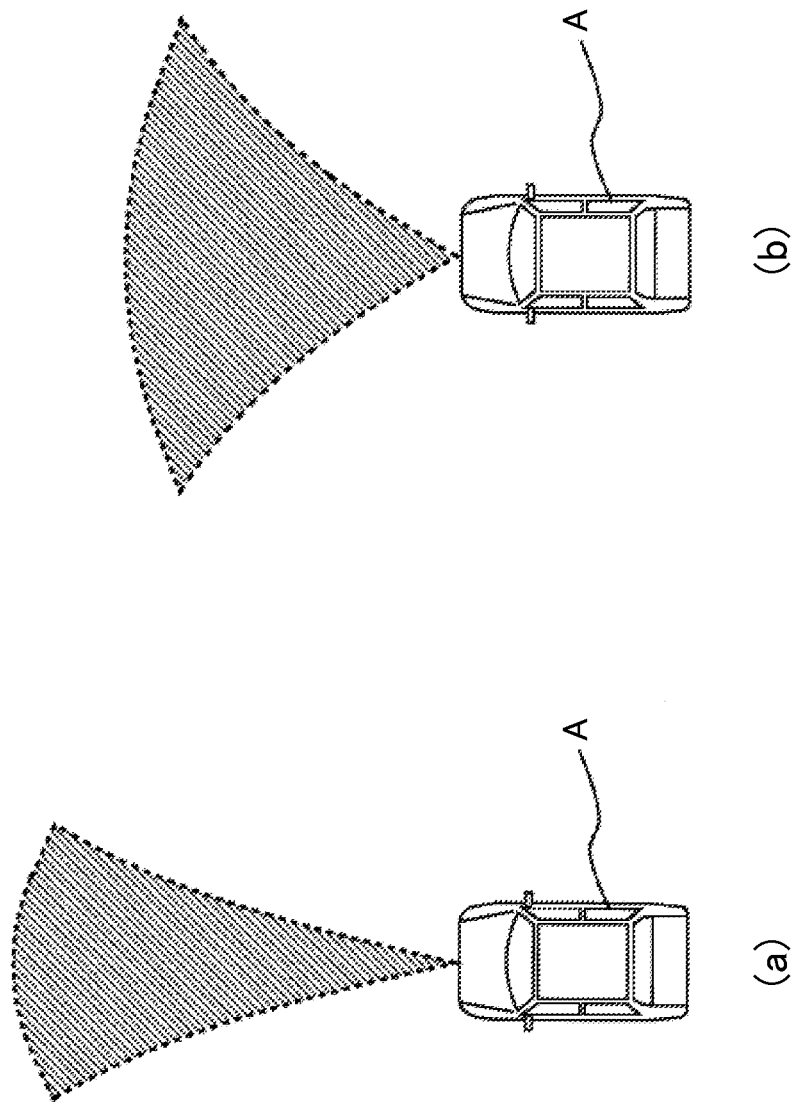
FIG. 7 is a view showing a correlation between a vehicle speed and the traveling range.

Besides, in this embodiment of the invention, the lateral acceleration is used as a parameter indicating the movement amount of the host vehicle. However, it is also possible to use a yaw rate, a lateral G, a cornering force, or the like. However, it is preferable to use a parameter that is correlated with the yaw rate and the vehicle speed, such as the lateral acceleration or the lateral G. The lateral acceleration and the lateral G increase as the yaw rate increases, and increase as the vehicle speed increases. In consequence, in the case where the lateral acceleration or the lateral G is used as a parameter indicating the movement amount of the host vehicle, the traveling range that is estimated by the traveling range estimation unit 101 is narrower when the vehicle speed is high ((a) in FIG. 7) than when the vehicle speed is low ((b) in FIG. 7), as shown in FIG. 7. As a result, the timing at which there ceases to be an avoidance line within the traveling range (the timing at which driving support is provided) is earlier when the vehicle speed is high than when the vehicle speed is low. In consequence, even in the case where the traveling speed of the host vehicle is high, a collision of the host vehicle with the solid body can be more reliably avoided.

Second Embodiment

Next, the second embodiment of the invention will be described on the basis of FIG. 8. In this case, configurational details different from those of the foregoing first embodiment of the invention will be described, and the description of similar configurational details will be omitted.

The difference between the foregoing first embodiment of the invention and this embodiment of the invention consists in that the magnitude of the normal change ΔGy is changed in accordance with the vehicle speed. In general, the magnitude of the lateral acceleration that is permitted when the driver performs a normal driving operation is larger in a low speed range than in a high speed range.

Figure 8:
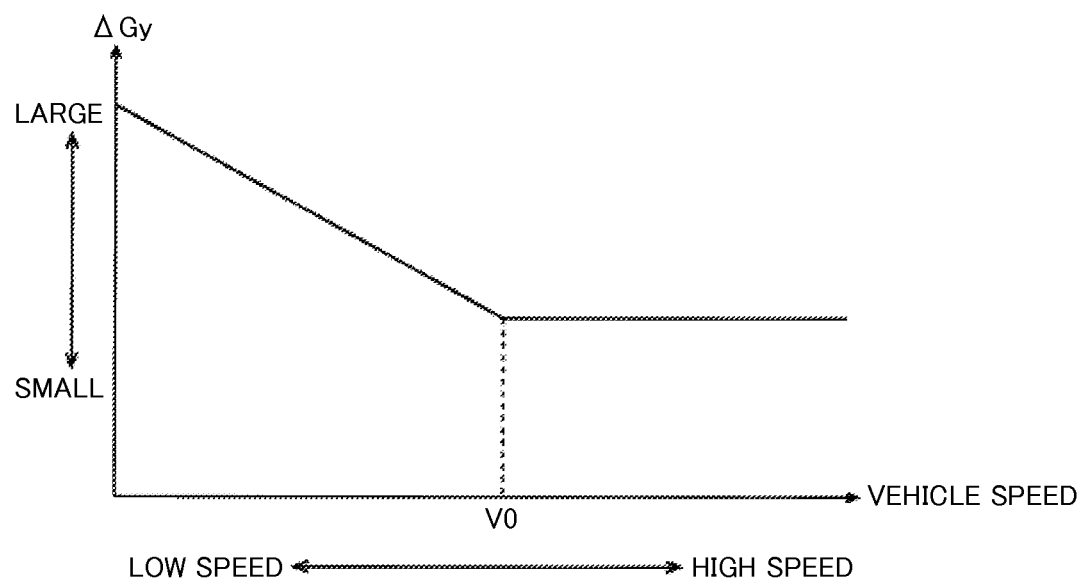
FIG. 8 is a view showing a relationship between a normal change and the vehicle speed.

Thus, as shown in FIG. 8, the normal change ΔGy may increase as the vehicle speed decreases in a region where the vehicle speed is lower than a specific vehicle speed V0, and may be fixed to a constant value in a region where the vehicle speed is equal to or higher than the specific vehicle speed V0. It should be noted herein that the specific vehicle speed V0 is a value that is statistically obtained in advance.

If the normal change ΔGy is thus changed in accordance with the vehicle speed, the number of opportunities in which driving support is provided against the intention of the driver when the host vehicle travels at a low speed can be reduced, and the timing at which driving support is provided can be made as late as possible. Besides, it is also possible to avoid a situation where the timing at which driving support is provided becomes late when the host vehicle travels at a high speed.

DESCRIPTION OF REFERENCE NUMERALS

1 ECU
2 OUTSIDE WORLD RECOGNITION DEVICE
3 YAW RATE SENSOR
4 WHEEL SPEED SENSORS
5 ACCELERATION SENSOR
6 BRAKE SENSOR
7 ACCELERATOR SENSOR

8 STEERING ANGLE SENSOR
9 STEERING TORQUE SENSOR
10 BUZZER
11 DISPLAY DEVICE
12 ELECTRIC POWER STEERING
13 ELECTRONICALLY CONTROLLED BRAKE
100 TRAVELING ROAD RECOGNITION UNIT
101 TRAVELING RANGE ESTIMATION UNIT
102 SUPPORT DETERMINATION UNIT
103 WARNING DETERMINATION UNIT
104 CONTROL DETERMINATION UNIT
105 CONTROLLED VARIABLE CALCULATION UNIT

The invention claimed is:

1. A vehicular driving support system comprising:
a recognition unit configured to recognize a solid body that exists around a host vehicle;
an acquisition unit configured to acquire a current movement amount of the host vehicle; and
a support unit configured to determine whether or not there is an avoidance line, as a route that allows a collision with the solid body recognized by the recognition unit to be avoided, within a traveling range of a route on which the host vehicle is to travel, and provide support for avoiding a collision with the solid body when it is determined that there is no avoidance line within the traveling range, wherein
the traveling range is a range from a first route to a second route, and
the first route is specified by adding a movement amount change that is produced within a range of a driving operation to be normally performed by a driver to the movement amount acquired by the acquisition unit, and the second route is specified by subtracting the movement amount change from the movement amount acquired by the acquisition unit.

2. The vehicular driving support system according to claim 1, wherein
the change is made larger when a traveling speed of the host vehicle is low than when the traveling speed of the host vehicle is high.

3. The vehicular driving support system according to claim 1, wherein
the movement amount is a parameter that makes the traveling range narrower when a traveling speed of the host vehicle is high than when the traveling speed of the host vehicle is low.

4. The vehicular driving support system according to claim 3, wherein
the movement amount is a parameter that is correlated with an acceleration in a lateral direction of the host vehicle.

5. The vehicular driving support system according to claim 1, wherein
the support unit is configured to provide support for avoiding a collision with the solid body if a length of a longest one of routes included in the traveling range becomes equal to or shorter than a threshold in a case where there is no avoidance line in the traveling range.

* * * * *